US008837820B2

(12) United States Patent
Murray et al.

(10) Patent No.: US 8,837,820 B2
(45) Date of Patent: Sep. 16, 2014

(54) IMAGE SELECTION BASED ON PHOTOGRAPHIC STYLE

(75) Inventors: Naila Murray, Santa Rosa Heights (TT); Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 259 days.

(21) Appl. No.: 13/480,598

(22) Filed: May 25, 2012

(65) Prior Publication Data

US 2013/0315477 A1 Nov. 28, 2013

(51) Int. Cl.
*G06K 9/62* (2006.01)
(52) U.S. Cl.
USPC .......................................................... 382/159
(58) Field of Classification Search
None
See application file for complete search history.

(56) References Cited

U.S. PATENT DOCUMENTS

| 7,266,544 | B1 | 9/2007 | Dodge et al. | |
|---|---|---|---|---|
| 2006/0251338 | A1 | 11/2006 | Gokturk et al. | |
| 2010/0313141 | A1* | 12/2010 | Yu et al. | 715/747 |
| 2011/0075917 | A1* | 3/2011 | Cerosaletti et al. | 382/159 |
| 2011/0142335 | A1 | 6/2011 | Ghanem et al. | |
| 2012/0054658 | A1* | 3/2012 | Chuat et al. | 715/771 |

FOREIGN PATENT DOCUMENTS

WO    WO 2008-060919 A2    5/2008

OTHER PUBLICATIONS

Banerjee, S., et al. "In-camera automation of Photographic composition rules", Jul. 2007, IEEE Transactions on Image processing, vol. 16, No. 7, pp. 1807-1820.
Ciancio, A., et al. "No-reference blur assessment of digital pictures based on multifeature classiers", IEEE Transactions on Image Processing, vol. 20, No. 1, Jan. 2011, pp. 64-75.
Mao, D., et al. "Understanding photographic composition through data-driven approaches", $5^{th}$ Intl. Conf. on Computer Vision Theory and Applications, 2010, pp. 1-6.
Liu, R., et al. "Image partial blur detection and classification", Computer Vision and Pattern Recognition, Jun. 2008, pp. 1-8.
U.S. Appl. No. 13/089,460, filed Apr. 19, 2011, Marchesotti, et al.
U.S. Appl. No. 13/089,504, filed Apr. 19, 2011, Marchesotti, et al.
Gemert, J. "Exploiting photographic style for category-level image classification by generalizing the spatial pyramid", Proceedings of the $1^{st}$ ACM Intl. Conf. on Multimedia Retrieval, 2011, pp. 1-8.
Stottinger, J. et al. "Translating journalists' requirements into features for image search", 2009, VSMM '09, $15^{th}$ Intl. Conf. on Virtual Systems and Multimedia, pp. 149-153.
Chang, Y., et al. "Finding good composition in panoramic scenes", 2009 IEEE $12^{th}$ Intl. Conf., pp. 2225-2231.

\* cited by examiner

*Primary Examiner* — Stephen R Koziol
*Assistant Examiner* — Amandeep Saini
(74) *Attorney, Agent, or Firm* — Fay Sharpe LLP

(57) ABSTRACT

A system and method are disclosed for image selection based on photographic style in which photographic style annotations are learned using a data-driven approach. The method includes assigning a style value for each of a set of photographic style categories to each of a set of database images with a trained classifier of a computing device. A user's selection of a subset of the photographic style categories, such as three style categories, is received. A user interface is generated for assigning values to each of the selected photographic style categories. A set of database images is identified, based on the assigned values for each of the selected photographic style categories and the style values for each of the selected photographic style categories of the database images.

24 Claims, 8 Drawing Sheets

IMAGE SELECTION BASED ON PHOTOGRAPHIC STYLE

BACKGROUND

The exemplary embodiment relates to the classification arts and finds particular application in connection with a system and method for selecting images based on photographic style by learning photographic style annotations using a data-driven approach.

Photographic style refers to a consistent way of shooting photographic images which can be achieved by manipulating camera configurations, such as shutter speed, exposure, ISO level, and the like. In general, different styles are achieved changing how a particular subject is shot, rather than by repeatedly shooting the same subject. Styles can impact the viewer in different ways. For example, motion blur is perceived as an indication of speed, activity, and dynamism.

Graphic designers often have access to large databases of photographic images which may be annotated with semantic content-based tags, such as "sky," "person," or "flower." While submitters of photographs to such creative databases are generally competent with regard to assigning content-based tags, they are often less able or willing to apply tags based on photographic style. Thus, when searching for an image which conveys a particular emotion or has a particular photographic style, the user is faced with searching through large numbers of images to find ones which meet the general criteria of interest.

Automated assessment of style has also proved difficult due to the shortage of such annotated data. Attributes of images have been selected in an attempt to make such assessments. Liu, et al., for example, uses three features (spectral slope, gradient histogram, and maximum saturation) to create feature vectors for training and classifying patches of an image as either blurry or non-blurry. A fourth feature, local auto-correlation, is used to classify each blurry patch further, as either an out-of-focus or a motion-type blur (Liu, et al., "Image partial blur detection and classification," CVPR pp. 1-8, 2008). In Gemert, stylistic attributes such as colorfulness, lighting, depth of field, viewpoint, and salience, are assembled into a semantic categorization model (Gemert, "Exploiting photographic style for category-level image classification by generalizing the spatial pyramid," ICMR, 14:1-14:8, 2011). Stöttinger, et al., describes features that may be used to retrieve images based on specific criteria, some of which relate to photographic style (Stöttinger, et al., "Translating journalists' requirements into features for image search," VSMM, pp. 149-153, 2009). These include color (full color vs. black and white), shooting focus (related to depth-of-field and macro styles) and composition (in the sense of the degree of complexity of the image).

There remains a need for a system and method which provides a more comprehensive approach to assigning aspects of photographic style to an image and which provides a user-friendly interactive method for retrieving images based on these aspects.

INCORPORATION BY REFERENCE

The following references, the disclosures of which are incorporated herein by reference in their entireties, are mentioned.

U.S. application Ser. No. 13/089,460, filed on Apr. 19, 2011, entitled IMAGE QUALITY ASSESSMENT, by Luca Marchesotti and Rodrigue Nkoutche.

U.S. application Ser. No. 13/089,504, filed on Apr. 19, 2011, entitled PREDICTING THE AESTHETIC VALUE OF AN IMAGE, by Luca Marchesotti, Florent Perronnin and Gabriela Csurka.

BRIEF DESCRIPTION

In accordance with one aspect of the exemplary embodiment, a method for aiding a user in selecting images based on photographic style includes, with a trained classifier of a computing device that has been trained on images annotated according to a set of photographic style categories, assigning a style value for each of a set of photographic style categories to each of a set of database images. A user's selection of a subset of the photographic style categories is received. A user interface is generated for assigning values to each of the selected photographic style categories. A subset of images in the database is identified, based on the user's assigned values for each of the selected photographic style categories and the style values for each of the selected photographic style categories of the database images.

In accordance with another aspect of the exemplary embodiment, a system for selecting images based on photographic style includes memory which stores a set of database images. Each of the database images has a style value for each of a set of photographic style categories based on style scores output by a trained classifier. A generator component generates a graphical user interface for display to a user. The graphical user interface enables the user to select a subset of the photographic style categories. The generator component generates a representation of the selected photographic style categories, whereby the user assigns values for the selected photographic style categories. A retrieval component retrieves a set of images from the database based on the assigned values for each of the selected photographic style categories and the style values for each of the selected photographic style categories of the database images. A processor implements the generator component and the retrieval component.

In accordance with another aspect of the exemplary embodiment, a method for generating a system for selecting images based on photographic style includes training a classifier with image representations based on features extracted from a set of training images and corresponding image labels. Each of the training images is labeled with a respective photographic style category selected from a set of photographic style categories. The photographic style categories include at least six photographic style categories selected from the group consisting of complementary colors, negative image, duotones, light on white, macro, rule of thirds, shallow depth of focus, vanishing point, high dynamic range, image grain, long exposure, motion blur, silhouettes, and combinations thereof, the photographic style categories being partitioned into three style classes, each of the style classes comprising at least two of the style categories. A style value for each of the set of photographic style categories is assigned to each of a set of database images with the trained classifier. The style category values are stored, whereby a subset of the set of database images is selectable based on a style value for style category selected from each of the three style classes.

DETAILED DESCRIPTION

The exemplary embodiment relates to a system and method which enable image searches to be tailored, based on photographic style. The exemplary system allows a user, such as a graphic designer, to perform a target-driven search using a taxonomy of photographic styles which allows combinations of style categories to be selected. A user interface is provided which allows the user to generate a query from within a space defined by the selected combination.

Figure 1:
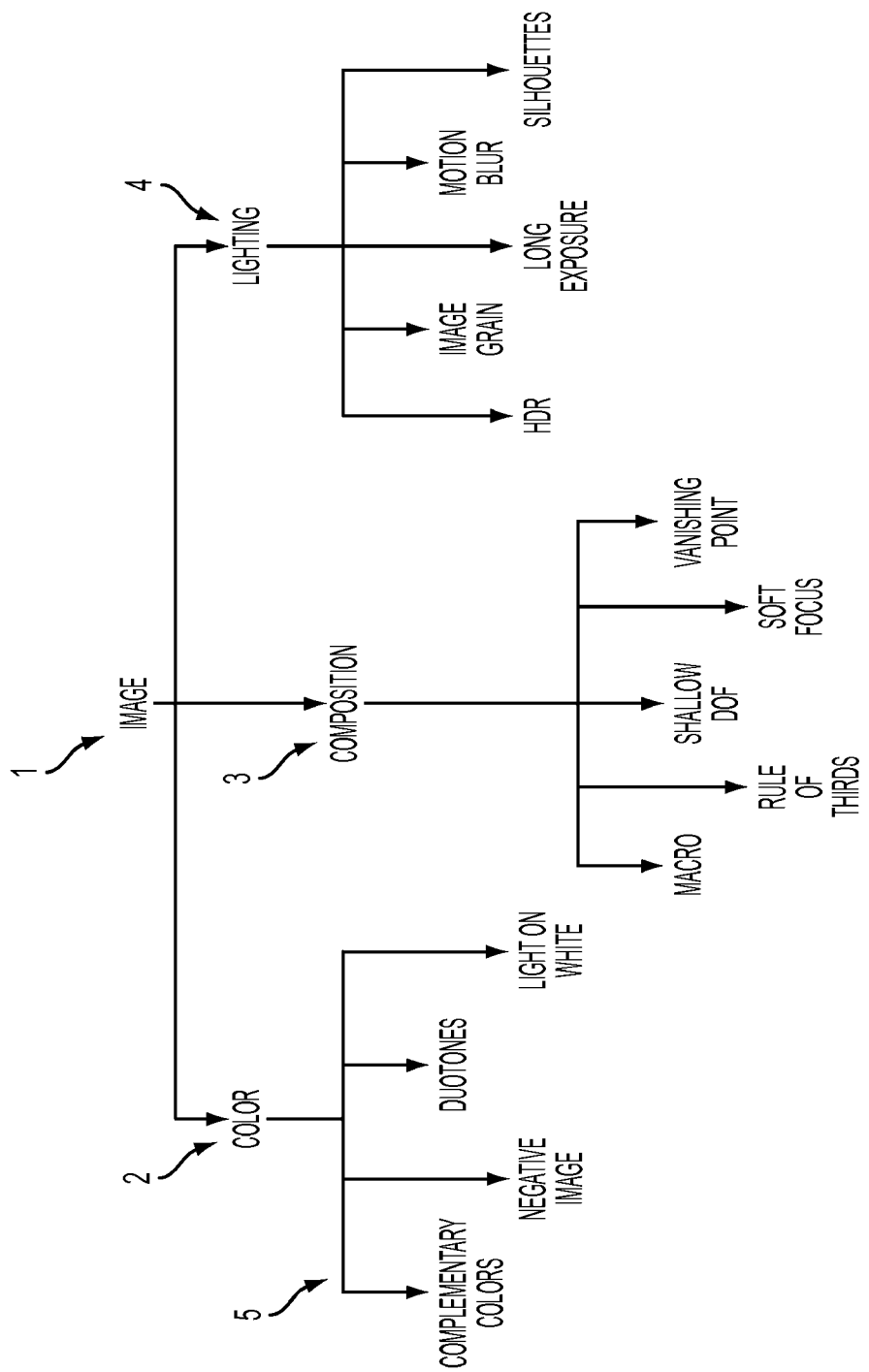
FIG. 1 illustrates an exemplary photographic style taxonomy.

A folksonomic approach may be used in defining the taxonomy of photographic styles. An exemplary taxonomy 1 is illustrated in FIG. 1. The exemplary taxonomy includes a plurality of photographic style classes 2, 3, 4, such as two, three, four, or up to ten or more classes. Three style classes 2, 3, 4, are shown by way of example. Within each class, a plurality of different style categories (sub-classes) 5 is provided, such as from 2-10 style categories. The style classes 2, 3, 4 are thus each partitioned into a set of categories 5, each class having a different, non-overlapping, set of style categories. As an example, the taxonomy 1 includes three photographic style classes 2, 3, 4, which are related to the three visual primitives typically manipulated by photographers using camera configurations: color, composition, and lighting. The classes 2, 3, 4 may each have a different number of style categories, for example, at least two of the classes have at least three, or at least four categories. While the exemplary taxonomy is generated manually, it is also contemplated that the taxonomy may be generated automatically or semi-automatically through unsupervised text analysis methods, e.g., probabilistic latent semantic analysis (pLSA), or latent semantic analysis (LSA).

The exemplary categories 5 are as follows:

For Color:

complementary colors: dominant colors of the image are from complementary colors of a color wheel, such as yellow with violet or red with green;

negative image: the colors of the image and/or luminance values are reversed, as in a color negative;

duotones: images in which two colors are used to represent different grayscale values of an image, such as black (for the darker pixels) and yellow (for the lighter ones); and light on white: a foreground part of the image which stands out from a white background.

For Composition:

macro: close-up images of a subject;

rule of thirds: predominant features of the image, such as the horizon or a person's eyes, are positioned on or close to an imaginary line generated by dividing the image horizontally or vertically into three equally-sized regions;

shallow depth of focus (DOF): the subject of an image is in focus, while other objects in the image are out of focus; and vanishing point: major lines of objects of the image appear to converge to a point.

For Lighting:

high dynamic range (HDR): the image has a wide range of luminance as compared to a typical image;

image grain: the image is visually grainy (noisy);

long exposure: the image captures changes which occur over time, as in a firework display;

motion blur: the image has both blurry and non-blurry objects, signifying movement of the blurry object; and silhouettes: an object appears dark against a lighter background.

It is to be appreciated that the exemplary system and method are not limited to these particular aspects of photographic style. It may also be noted that the exemplary style categories are largely independent of the semantic content of the image. For example, a photographic image of a person could be assigned to any one or more of these categories, depending on the photographic techniques used in capturing the image.

The set of style categories 5 may be selected based on the interests of the users, and/or based on common aspects of photographic style found in images in a database of images. Some aspects of style may be more difficult to assign to images using automated classification techniques and thus these aspects may be grouped together as a single category or excluded from the taxonomy 1.

Some of the photographic styles represented by these categories tend to occur independently while others tend to co-occur. In general, the categories within a class are more likely to be independent, i.e., they are not found together in an image, while style categories taken from different classes can co-occur in an image. This means that an image can have a specific composition (e.g., shallow depth of focus) but also complementary colors and a long exposure.

Figure 2:
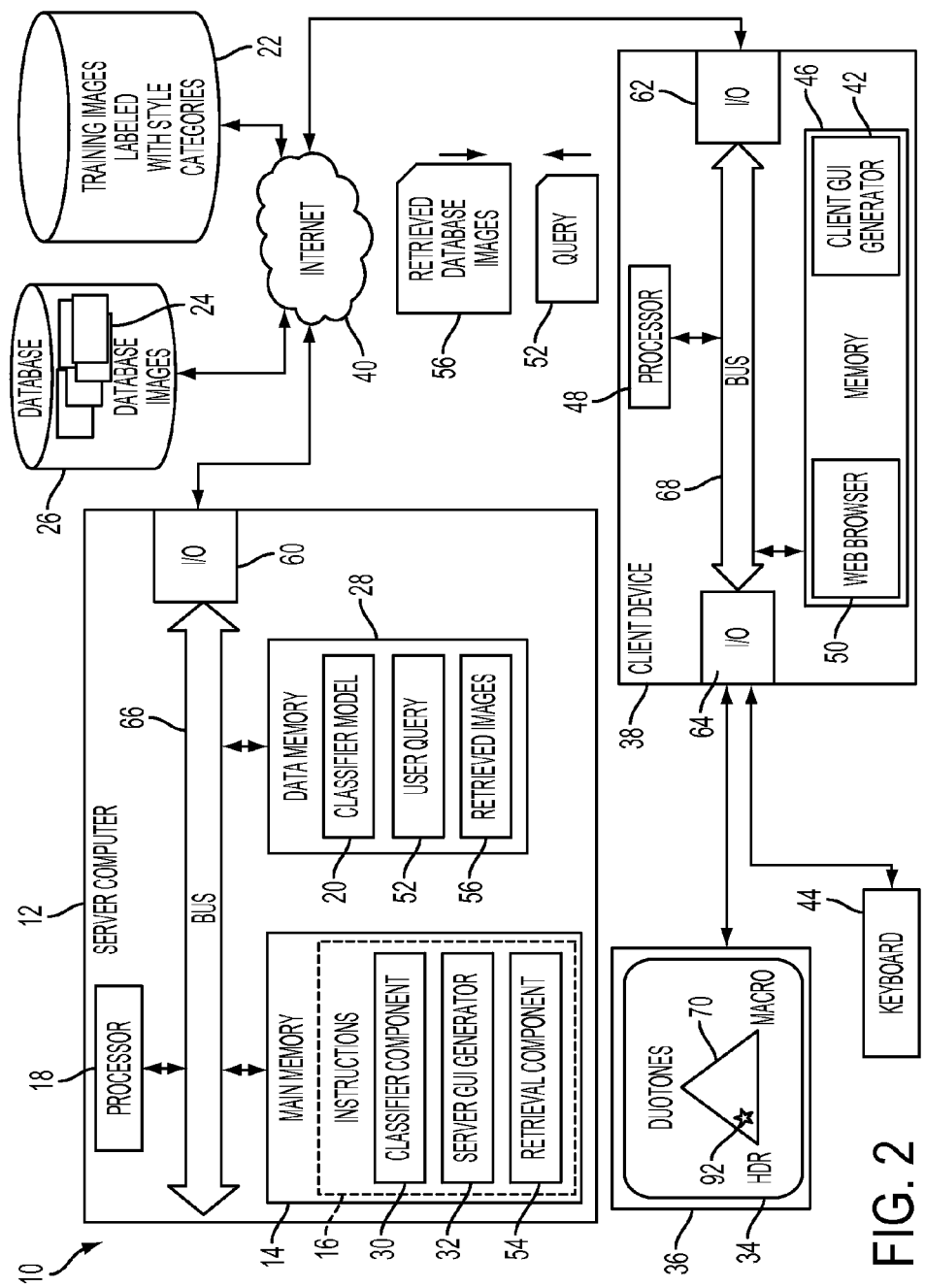
FIG. 2 is a functional block diagram of an image retrieval system in accordance with one aspect of the exemplary embodiment.

FIG. 2 illustrates an exemplary system 10 for classifying and retrieving photographic images based on the exemplary photographic style taxonomy 1. The system includes a first computing device 12, such as server computer, which includes main memory 14 that stores instructions 16 for performing the exemplary method described with reference to FIG. 3. A processor 18, in communication with the memory 14, implements the instructions. The exemplary method includes a training phase, in which a statistical classifier model (or "classifier") 20 is trained using a training set 22 of training images that have each been annotated with one or more of the style categories 5. The classifier model 20 is trained with features extracted from each training image 22 and the corresponding label. For example, a multidimensional representation of the image 22 is generated, based on the extracted features, and is fed to the classifier. The trained classifier model 20 is then used to assign photographic style labels, corresponding to the selected style categories, probabilistically to each of a set of database images 24 stored in an image database 26, based on features extracted from the database images. The database images 24 initially have no photographic style labels attached to them, or if they do, do not have assigned probabilities for each the exemplary photographic style categories. The trained classifier model 20 may be stored in data memory 28 of the system 10. The training of the classifier model 20 is performed by a classifier component 30 stored in memory 14, or elsewhere in the system. The database images 24 may each be assigned a style value for each of the set of style categories by the classifier component 30, based on the probability (style score) output by the classifier model 20. In generating the style values, the probability scores may be normalized to a range of 0-1 for each of the style categories, based on the maximum and minimum probability scores output by the classifier over the dataset 24. As will be appreciated, the manually labeled training images 22 may also be assigned style scores by the classifier model 20 and incorporated into dataset 24.

Having assigned each database image 24 a style value for each of the photographic style categories 5, the classifier component 30 and classifier model 20 are no longer necessary and may be omitted from the system 10. Alternatively, the classifier component 30 and classifier model 20 may be maintained in the system 10 for labeling new images 24 as they are added to the database 26, and/or for retraining the model 20 on a new set of training images 22.

In some embodiments, the images 24 in the database may also be annotated with semantic category labels or values, for a predefined set of semantic categories. As previously noted, semantic labels relate to the visual content of the image, and can be general category labels, such as for a type of scene, such as "landscape", "urban", "beach", and/or categories for specific items, such as "person", "building", "car", and the like. The semantic labels or values may be manually or automatically assigned to the database images 24. In the case of automatic assignment, one or more classifiers may be trained using a set of training images that have each been labeled with a semantic category. The labels, together with corresponding representations of the images, are input to the classifier to learn a classifier model. The representations may be based on features extracted from the training images, which can be obtained in the same way as for the style labels, and in one embodiment, may use the same representations.

Figure 4:
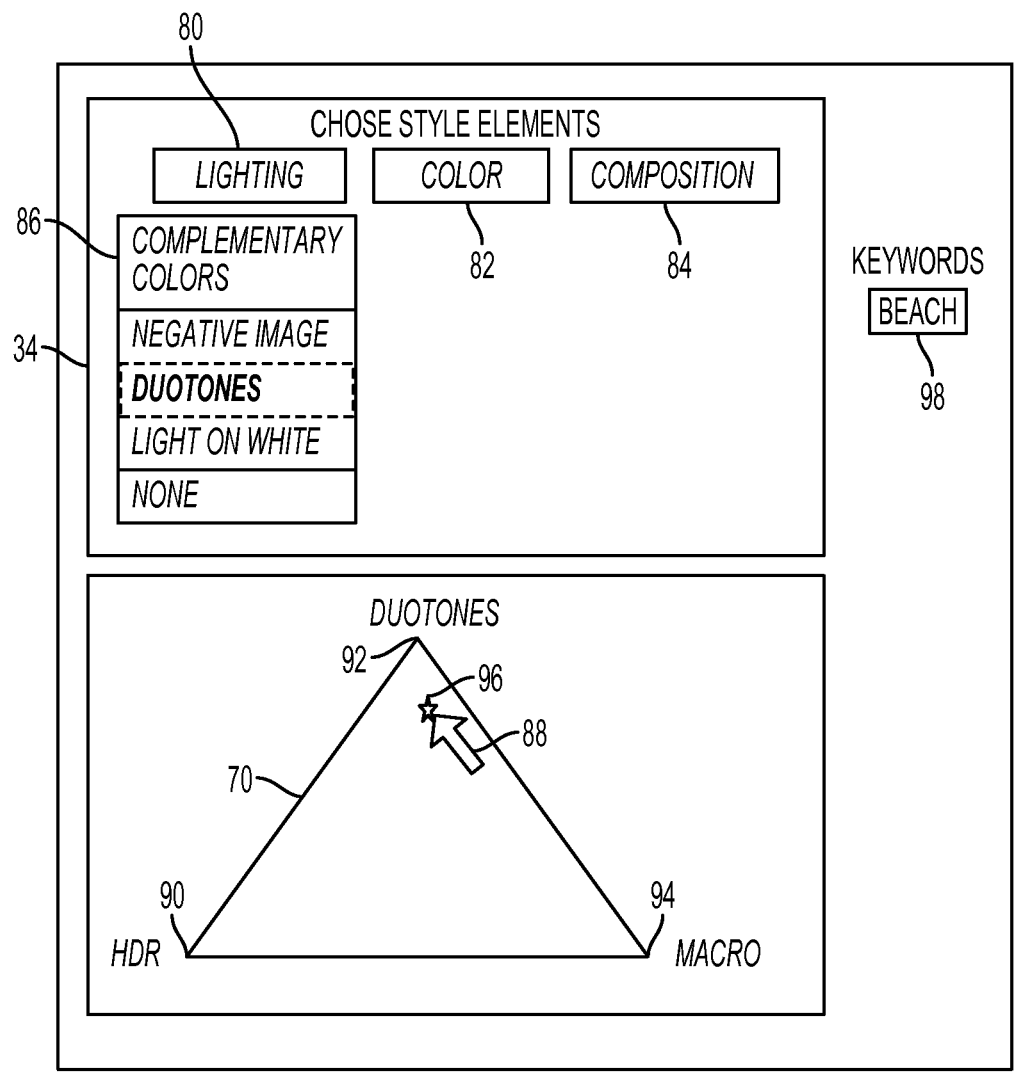
FIG. 4 illustrates an example graphical user interface for defining style characteristics.
Figure 5:
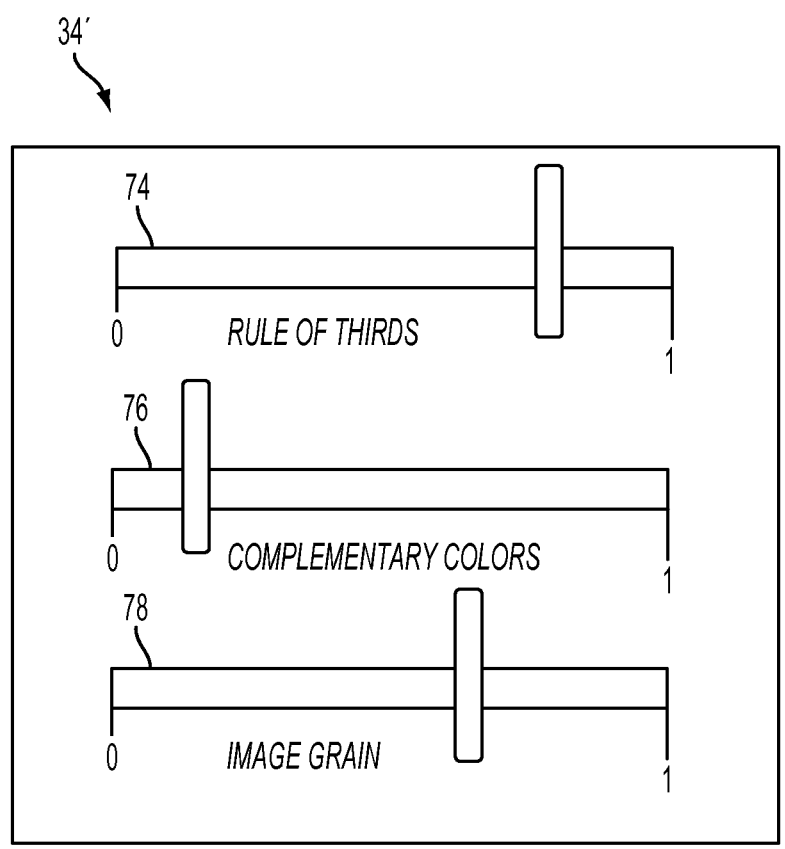
FIG. 5 illustrates another example graphical user interface for defining style characteristics.

The system 10 further includes a graphical user interface (GUI) generator 32 for generating a graphical user interface 34 which is displayed on a display device 36, such as an LCD screen, of an associated client computing device 38. Example interfaces 34, 34' are shown in FIGS. 4 and 5. The graphical user interface generator 32 can be resident in memory on one or more of the computing device 12 and the client device 38.

With continued reference to FIG. 2, the client device 38 may be communicatively linked to the computing device 12 by a wired or wireless link 40, such as a local area network or a wired area network, such as the Internet. In one embodiment, the client device 38 is provided with a client GUI generator 42 which includes the instructions for displaying the GUI 34, 34' on the associated display device 36 and for receiving user inputs corresponding to style value selections on the GUI. The user inputs may be made via a user input device 44, such as a keyboard, keypad, touch screen, cursor control device, such as a mouse joystick, or the like, or a combination thereof. The client device 38 includes memory 46, which stores the software of the client side of the GUI generator 42, and a processor 48, in communication with the memory 46, for implementing the GUI generator 42. The client device 38 may communicate with the server computer through a web browser 50. The browser may be link the client device with a website hosted by the server 12 or by a linked computer. In this way, a query 52 is uploaded to the server computer 12, based on the user's style value selections made via the GUI 34.

The computer system 10 further includes a retrieval component 54 for retrieving a subset 56 of the database images 24 responsive to the query 52. The client computing device 38 then receives one or more of the database images 56 that are responsive to the query 52. This may include receiving one or more of the full resolution images themselves, a unique link to each of the responsive images 24 in the database 26, and a thumbnail (reduced pixel resolution version) of the image(s). The retrieved images 56 are then displayed to the user on the display device 36, or on another display device.

Each of the computing devices 12, 38 includes one or more respective input/output devices 60, 62, 64 for communicating with external devices. The various hardware components of the computing device 12, 38 may be all connected by a respective bus 66, 68. As will be appreciated, the arrangement of computing devices 12, 38 is illustrative only, and the components of the system 10 can be distributed over fewer or more computing devices. For example the display device 36 may be linked directly to the computing device 12, rather than through a client device 38.

The computer system 10 and/or client device 38 may each include one or more computing devices, such as a PC, such as a desktop computer, a laptop computer, palmtop computer, portable digital assistant (PDA), server computer, cellular telephone, tablet computer, pager, combination thereof, or other computing device capable of executing instructions for performing the exemplary method.

The memory 14, 28, 46 may represent any type of non-transitory computer readable medium such as random access memory (RAM), read only memory (ROM), magnetic disk or tape, optical disk, flash memory, or holographic memory. In one embodiment, the memory 14, 28 comprises a combination of random access memory and read only memory. In some embodiments, the processor 18 and memory 14 may be combined in a single chip. Memory 46 may be similarly configured. The network interface 60, 62 allows the respective computing device to communicate with other devices via a computer network, such as a local area network (LAN) or wide area network (WAN), or the Internet, and may comprise a modulator/demodulator (MODEM). Memory 14 and/or 46 stores instructions for performing the exemplary method.

The digital processor(s) 18, 48 can be variously embodied, such as by a single-core processor, a dual-core processor (or more generally by a multiple-core processor), a digital processor and cooperating math coprocessor, a digital controller, or the like. The digital processor 18, 48 in addition to controlling the operation of the computing device 12, executes instructions stored in memory 14 for performing the method outlined in FIG. 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computing device 12, 38. Since the configuration and operation of programmable computers are well known, they will not be described further.

Figure 3:
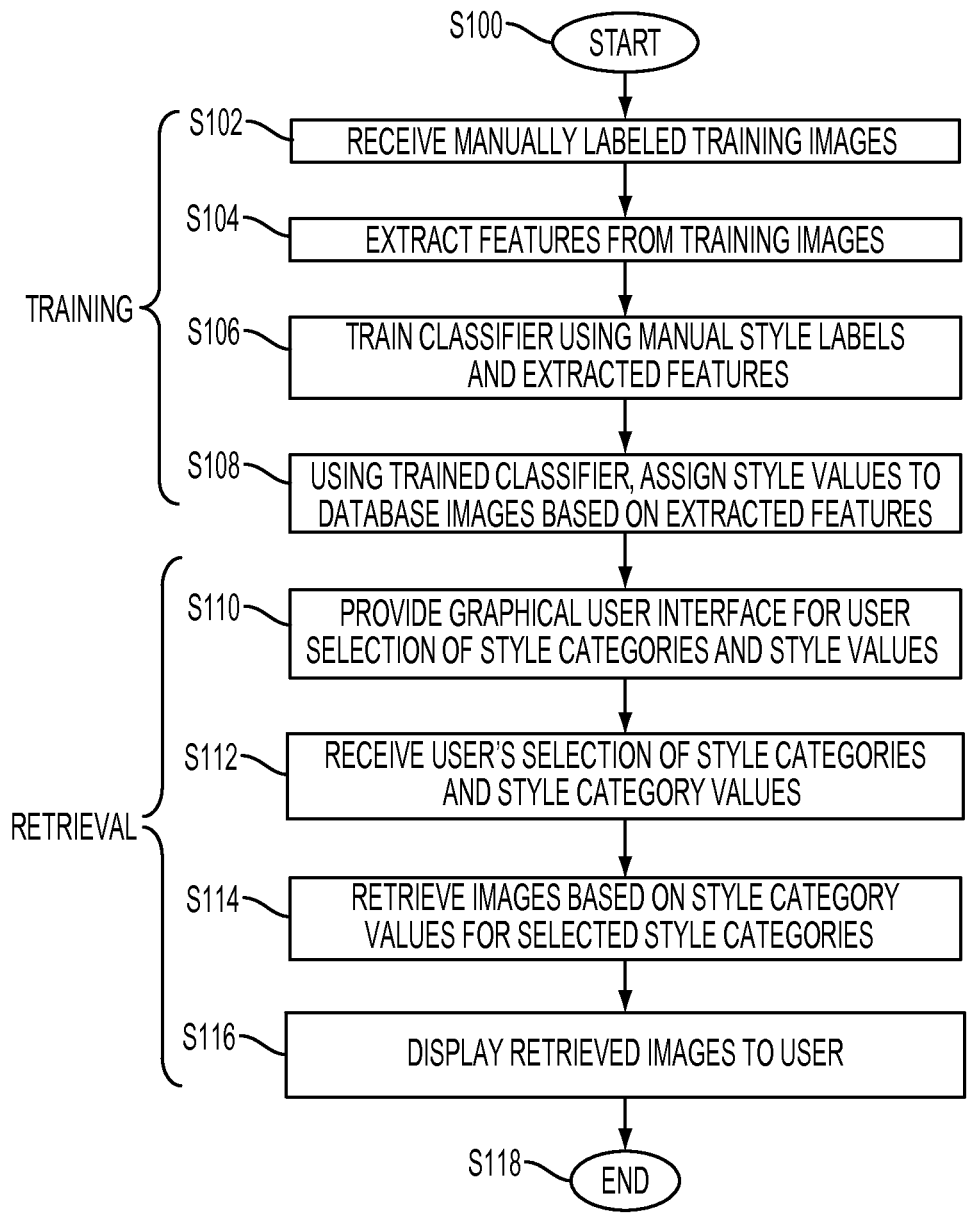
FIG. 3 is a flow diagram illustrating an image retrieval method in accordance with another aspect of the exemplary embodiment.

With reference now to FIG. 3, a method for training a style classifier and for retrieving images based on photographic style selections is shown. The method begins at S100. The method starts with a training phase.

At S102, a set 22 of labeled training images is received into memory 28. Each image in the set 22 includes a label corresponding to one of the finite set of style categories, which a human reviewer has selected, directly or indirectly. Methods for identifying appropriate style categories for images 24 are described below.

At S104, for each image in the set 22 of labeled training images, features are extracted from the corresponding image data. The extracted features are used to generate a representation of the respective image, such as a multidimensional vector. As will be appreciated, if the features/representation have previously been generated, it is not necessary to receive the images 22 themselves, only their feature representations. In this case, step S104 can be omitted.

At S106, the image representations and the corresponding photographic style labels of the images 22 are jointly used to learn a classifier model 20.

At S108, the trained classifier model 20 is applied to a set 24 of images to generate style category values for the images. In particular, for each of the images in the set 24, features are extracted and an image representation generated, in the same manner as for the training images 22. The representation is input to the trained classifier model 20 and, for each image in the set 24, the classifier probabilistically assigns a score (likelihood) for each of the style categories, which may be normalized to a value in a numerical range of for example, 0 to 1. A resulting style category value is then assigned to each image 24 for each of the style categories, based on the normalized scores output by the classifier 20. The style values for each of the images are stored in the database 26 or elsewhere, such as in memory 28, in a manner which allows them to be linked to the corresponding image in the set 24. This completes the training stage.

At S110, at the start of a retrieval stage, e.g., when the user has loaded the client GUI generator application, a graphical user interface 34 is generated by the system and presented to a user on the display device 36. The exemplary GUI 34 allows a user to select a maximum of one style category from each of a plurality of style classes 2, 3, 4. In the exemplary embodiment, the user can select up to three photographic style categories, since there are three style classes, defined according to the topology 1.

At S112, the user inputs the style value selections via the GUI 34 and a query 52 comprising the selected style values is received by the system 10. The GUI 34 of FIG. 4 allows the user to select a value for each of the selected style categories via a two-dimensional representation 70 of the space of possible style values. By selecting (x,y) coordinates of a single point within the two-dimensional representation 70, the user inherently selects all three style values simultaneously. The alternate GUI 34' of FIG. 5 allows the user to specify each of the three style values independently, through one dimensional sliders 74, 76, 78. Other methods of selecting photographic style values are also contemplated, for example, the user may be prompted to input numerical style values via the keyboard.

At S114, the retrieval component 54 generates a query in a suitable query language for querying the database 26, based on the query 52, and identifies and/or retrieves a subset of responsive images 56 from among the set of images 24 in the database 26. The subset 56 may include one or more images such as the top K most responsive images. The responsive images 56 themselves, or a locator for the images, such as a URL, may be stored temporarily in system memory 28.

At S116, at least a portion (or all) of the identified responsive images 56 may be displayed to the user, e.g., on the display device 36. In other embodiments, one or more of the identified images 56 may be used for other purposes, such as for training another classifier, for importing directly into documents with or without any user review, or the like.

The method ends at S118.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the exemplary method.

As will be appreciated, the steps of the method need not all proceed in the order illustrated and fewer, more, or different steps may be performed.

Further details on the system and method will now be described.

Training and Database Images

Images in datasets 22, 24 may be received and/or stored in any convenient file format, such as JPEG, TIFF, GIF, JBIG, BMP, or other common file format used for images and which may optionally be converted to another suitable format prior to processing. Images may be individual photographs, video images, three-dimensional images, combined images which include text/graphics as well as a photograph, and the like. In general, each digital image includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single color separation, however expressed (RGB, L*a*b*, YCbCr, etc.). The exemplary system and method are applicable to monochrome images (one color separation) as well as to multicolor images (two or more color separations). In general, there are at least some multicolor images and optionally also some monochrome images in the database 26. As used herein, "image data" does not include labels or other textual information, which may accompany the image data, e.g., as meta data, an HTML tag, information in an associated file, or the like.

In some embodiments, images 22, 24 may be stored, retrieved, and/or displayed in a modified format, e.g., as cropped images, reduced pixel resolution images (thumbnails), or image processed images, such as color enhanced images, or the like. For convenience, each of these will still be referred to as "the image."

Classifier Training (S104, S106)

To minimize errors, the training set 22 may include images which have each been labeled with no more than one of the style categories 5. The training images 22 may be retrieved from any suitable source, and may include a wide range of visual content or be focused to a particular user's interest. One method for identifying images labeled according to style is to collect the responses to photographic challenges which have been posted on a website. For example, the website www.DPChallenge.com posts photographic challenges which include a title and textual description, some of which narrowly relate to one of the photographic styles of interest. The responses received by the website are posted and voted on by reviewers. The entire set of submissions to a relevant challenge (or challenges) can be used, or the set filtered, for example, by selecting only those images which have received the highest number of votes or other correspondingly high score, thereby filtering out the lowest scoring images for each or at least some categories. Images which have been submitted for more than one of the relevant challenges (corresponding to a style category) may also be filtered out. The remaining set of images for a relevant challenge is then annotated with a label corresponding to the respective style category.

In other embodiments, images in a collection are reviewed by reviewers and images which meet a specification for one of the photographic style categories are manually labeled as such.

For training the classifier 20, features are extracted from the labeled images 22. Various features may be used. These may include visual features and/or textual features. For example, in the case of visual features, the classifier component 30 may include a patch extractor, which extracts and analyzes content-related features of patches of the image 22, 24, such as shape, texture, color, or the like. The patches can be obtained by image segmentation, by applying specific interest point detectors, by considering a regular grid, or simply by random sampling of image patches. The extracted low level features (such as vectors) from each patch can be concatenated to form a features vector which serves as the image representation. In other approaches, the feature vectors of an image are assigned to clusters. For example, a visual vocabulary is previously obtained by clustering low-level features extracted from training images, using for instance K-means. Each patch vector is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., ball or sphere, rod or shaft, etc.), characteristic background (e.g., starlit sky, blue sky, grass field, etc.), or the like. Given an image to be categorized, each extracted feature vector is assigned to its closest visual word in the previously trained vocabulary or to all visual words in a probabilistic manner in the case of a stochastic model. The vector can be used to train the model in the case of labeled images 22.

By way of example, one or more of the following four types of features may be used. The first three feature types are visual features, which are based on the image data. The fourth is based on associated information, such as is found in metadata of the image.

1. Gradient features, such as Scale Invariant Features Transform (SIFT) descriptors. These features, which are invariant to scaling and rotation, partially invariant to illumination and 3-D viewpoint, are implemented as histograms of oriented gradients which are computed on each patch. See, for example, Lowe, "Object Recognition from Local Scale-Invariant Features," International Conference on Computer Vision (ICCV), 1999. The SIFT descriptors can be Gaussian derivatives computed at, for example, eight orientation planes over a four-by-four grid of spatial locations, giving a 128-dimensional vector (that is, 128 features per features vector). In one illustrative example, these features are extracted from 32×32 pixel patches on regular grids (every 16 pixels) at five scales, using the 128-dimensional SIFT descriptors. These features may be assembled into feature vectors in a pyramidal structure to capture the composition of the image. By this it is meant that the image is partitioned into a number of regions, e.g., on a 3×3 grid. This gives 9 small regions (of dimensions 1×1), three larger regions (of dimensions 1×3), and one 3×3 region covering the entire image. For each region, a representation is generated based on the extracted features (of the patches) within it. The region representations can be concatenated or otherwise aggregated into an image representation.

2. Color statistics. These may include one or more of mean, standard deviation, minimum, and maximum of each color channel calculated on one or more color spaces, such as HSV, L*a*b*, RGB, or the like. For example, simple 96-dimensional color features in which a patch is subdivided into 4×4 sub-regions and in each sub-region the mean and standard deviation are computed for the three channels (R, G and B) can be used.

3. Local Binary Patterns (LBP). These are efficient features for capturing texture and object patterns. They may be implemented by dividing the image into cells (patches) with the same number of pixels in each, such as from 9 to 1024 pixels (e.g., 16×16 pixels for each cell). For each pixel in a cell, the pixel is compared to each of its neighbors. The number of neighbors may be the eight nearest neighbors, or the like. For each of the neighboring pixels in turn (e.g., following a circular path) a difference between the center pixel and the neighboring pixel is computed (e.g., in one or more of the channels of the color space, such as the luminance channel). Where the center pixel's value is greater than the neighbor, a "1" is stored, otherwise "0". In the case of 8 nearest neighbors, this gives an 8-digit binary number. A histogram, over the cell, of the frequency of each occurring "number" is computed. After normalization, histograms of all cells can be concatenated. This can provide the image representation. See, for example, T. Ojala, M. Pietikäinen, and D. Harwood, "Performance evaluation of texture measures with classification based on Kullback discrimination of distributions," Proc. 12th IAPR Intern'l Conf. on Pattern Recognition (ICPR 1994), vol. 1, pp. 582-585 (1994), for a fuller description of this approach.

4. EXchangeable Image file Format (EXIF) features. These are features derived from EXIF tags embedded in the image's header. For example, only features relevant to photographic style are extracted, such as one or more of:

(a) Focal length: a measure of how strongly the system converges (focuses) or diverges (defocuses) light. Longer focal length is associated with larger magnification of distant objects, and a narrower angle of view. Conversely, shorter focal length is associated with a wider angle of view.

(b) F-number: is the focal length divided by the "effective" aperture diameter. It is a dimensionless number that measures the "speed" of lens. Depth of field increases with f-number. This means that photographs taken with a low f-number will tend to have subjects at one distance in focus, with the rest of the image (nearer and farther elements) out of focus. Picture sharpness also varies with f-number. The optimal f-stop varies with the lens characteristics.

(c) Exposure time: also called shutter speed, captures the effective length of time a camera's shutter is open and therefore the duration of light reaching the image sensor. Shutter speed can have a dramatic impact on the appearance of moving objects.

(d) ISO level: ISO rating indicates the level of sensitivity to light of the photo-sensor. When increasing the sensitivity, the output of the sensor is amplified, so less light is needed. However, that also amplifies the undesired noise. Incidentally, this creates more grainy pictures, which for some applications is an interesting style characteristic.

Some or all of the exemplary features listed above can be used to train a classifier 20 capable of generating a vector $c_i = \{c_i(1), \ldots, c_i(j), \ldots, c_i(C)\}$ where $c_i(j)$ is the likelihood that the i-th image represents the style concept associated with the j-th category.

Such features can be used independently or jointly. The classifier 20 can include a set of binary classifiers, one for each style category. Or it may be a multi-class classifier which is trained to output a value for each class. The features extracted from each training image 22 can be aggregated (e.g., concatenated) into a single image representation of the image which is input to the classifier (or set of binary classifiers) along with its label. This enables an early fusion approach to be used in generating the style values of the unlabeled images 24. In other embodiments, a set of classifiers is trained, one for each of the feature types. The trained classifiers can then each assign style scores for the unlabeled images 24 and the results aggregated by category in a late fusion approach. In the exemplary embodiment, the feature types are not-weighted. However, in some embodiments, the features: Color, SIFT and LBP, for example, are weighted in the late fusion. Feature vectors may be reduced in dimensionality, e.g., using principal component analysis (PCA) prior to inputting into the classifier 20.

In some embodiments, the labeled training images 22 for a given category constitute the positive samples for training a binary classifier model for that style class. Negative samples for the classifier model can be drawn from images which are not labeled with the respective category.

Two techniques which model the distribution of feature sets using fixed-length vectorial representations are described by way of example. The first is the bag-of-visual-words (BOV) approach, described in U.S. Pub. No. 20080069456 and in G. Csurka, et al, "Visual categorization with bags of keypoints," in ECCV SLCV Workshop, 2004. The second is the Fisher vector (FV), described in U.S. Pub No. 20120045134 and F. Perronnin and C. Dance, "Fisher kernels on visual vocabularies for image categorization," in CVPR, 2007; and F. Perronnin, J. Sánchez, and T. Mensink, "Improving the fisher kernel for large-scale image classification," In ECCV, 2010".

In the BOV representation an image (or region) is described by a histogram of quantized local features. More precisely, given an (unordered) set of the local descriptors, such as set of SIFT descriptors or color descriptors extracted from a training or test image, a BOV histogram is computed per region. These region-level representations can then be concatenated or otherwise aggregated to form an image representation (e.g., one for SIFT features and one for color features).

During the training phase, a visual vocabulary, i.e., a set of prototypical features, is first learned by automatically clustering a large number of local descriptors from different images, using for example, K-means. Each patch local descriptor (e.g., a 96 or 64 dimensional vector) is then assigned to a nearest cluster and a histogram of the assignments can be generated. In other approaches, a probabilistic framework is employed. For example, it is assumed that there exists an underlying generative model, such as a Gaussian Mixture Model (GMM), from which all the vectors are emitted. Each Gaussian (function) in the GMM can be identified with a visual word and the clustering of the local descriptors can be performed through standard EM learning of the GMM parameters (mean and covariance of each of the Gaussians and weight of each Gaussian (function) in the GMM). The GMM vocabulary provides a principled way to cope with assignment uncertainty as each local feature is assigned with a probability to all visual words. (see, e.g., J. Farquhar, S. Szedmak, H. Meng, and J. Shawe-Taylor, "Improving "bag-of-keypoints" image categorisation," Technical report, University of Southampton, 2005). The number of Gaussians in the GMM can be, for example, at least about 100, e.g., at least 10,000. The number can be up to 100,000 and in one embodiment, is less than 10,000, such as about 2000.

The Fisher Vector extends the BOV by going beyond counting (0-order statistics) and by encoding statistics (up to the second order) about the distribution of local descriptors assigned to each visual word (see, T. Jaakkola and D. Haussler, "Exploiting generative models in discriminative classifiers," in *NIPS*, 1999, hereinafter Jaakkola; and U.S. Pub No. 20120045134, incorporated by reference.

Other features which may be extracted and methods of generating feature-based image representations are described, for example, in U.S. Pub. Nos. 2007005356, 20070258648, 20080069456, 20080317358, 20100092084, 20100098343, 20100191743, 20100189354, 20100318477, 20110026831, 20110040711, 20110052063, 20110091105, 20120045134, and U.S. application Ser. No. 12/890,789, filed on Sep. 27, 2010, entitled IMAGE CLASSIFICATION EMPLOYING IMAGE VECTORS COMPRESSED USING VECTOR QUANTIZATION, by Jorge Sanchez, et al., the disclosures of all of which are incorporated herein in their entireties by reference.

The classifier(s) 20 may be trained with any suitable linear or non-linear training algorithm, such as Sparse Linear Regression (SLR), Sparse Multinomial Logistic Regression (e.g., for a classifier which classifies into more than two classes), random forests (decision trees), standard logistic regression, neural networks, linear support vector machines (SVM), SVM using radial basis function (RBF) kernels, linear discriminant analysis, naïve Bayes, Perceptrons, polynomials, linear regression, or any other suitable machine learning method.

As an example, the classifier 20 may be configured as for the Generic Visual Categorizer described in above-mentioned U.S. Pub. Nos. 2007005356, 20070258648, 20080069456, and/or 20110091105.

The same representation may be used for the classifier(s) used to semantic category. Alternatively, the features are selected which are most appropriate to the classification task. For example, the semantic classifiers may use a combination of color and gradient features.

Database Image Scoring (S108)

Once the parameters of the classifier model(s) 20 have been learned, as described above, the classifier model can be used to assign style scores to the images 24 in the database 26. A feature-based representation is extracted from each image 24, using the same features described above for the training images.

The image representation is input to the trained classifier model 20, which outputs a style score for each of the categories. Once all the images 24 have been processed in this way, the style scores for each category are normalized to provide style values such that the highest style value found among all the images is given the maximum value, e.g., 1, and the lowest style score for that category is assigned a 0. The remaining style scores are then mapped to values within this range. Each image in the database is then assigned a style vector, as described above, which includes, for each of the categories, a normalized style value for that category, e.g., in a range from a minimum to a maximum value such as 0-1. The style values are thus not binary values but include values between 0 and 1, i.e., values which are >0 and <1. The style values may, however, be rounded to a nearest 0.01 or 0.05, for example. An example style representation of an image 24 may be (0.10, 0.35, 0.25, 0.60, 0.8, 0.1. 0.05, 0.05, 0.20, 0.0, 0.95, 0.80, 0.1, 0.05). The vector may of course be stored as a binary value.

For example, assuming a set of database images I=1, . . . , i . . . , N each with associated C style scores $s_i(c)$, the scores are normalized to provide style values $s_i^n(c)$ as follows:

$$s_i^n(c) = \frac{s_i(c) - \min_i s_i(c)}{\max_i s_i(c) - \min_i s_i(c)} \tag{1}$$

Graphical User Interface

FIG. 4 illustrates an example graphical user interface 34. The user is presented with the three style classes as shown at 80, 82, 84. Preserving the multi-style aspect is considered to be of significant value. This is especially true in a retrieval scenario where, in general, more than a visual element is helpful for the search.

With a cursor control device, such as a mouse or with finger touch on a touch screen, the user clicks on one of the three classes and is presented with a list of the categories in that class, e.g., as a drop down menu 86. The user selects one of the categories, e.g., by pointing and clicking with the cursor 88. This may be repeated for each of the two remaining classes 82, 84. In this way, the user is permitted to select only one style category from each of the style classes. In other embodiments, it is contemplated the user may be permitted to select more than one category from a class or the concept of classes may be omitted.

Once the user has selected the style categories, the system 10 automatically generates a style value selection map 70, which allows a user to select values of each of the style categories with a single click. The exemplary map 70 is in the shape of an equilateral triangle, where each vertex 90, 92, 94 represents the maximum value for a respective one of the three selected style categories, the textual description of which is displayed next to the vertex. The minimum value for each category corresponds to the side of the triangle furthest from the vertex. The user is prompted to select a position within the boundary of the triangle defined by its three sides. The triangle 70 defines the space of possible queries (or at least with respect to photographic style), which are represented by all points within the triangle.

For example, in FIG. 4, the user has positioned the cursor 88 (or a finger touch) near the vertex 92 representing duotones, and clicked on a position there, which is displayed as a star 96, by way of example. This position corresponds to a relatively high value of the duotones style category and a relatively lower value of each of the other two user-selected categories, HDR and macro.

Figure 6:
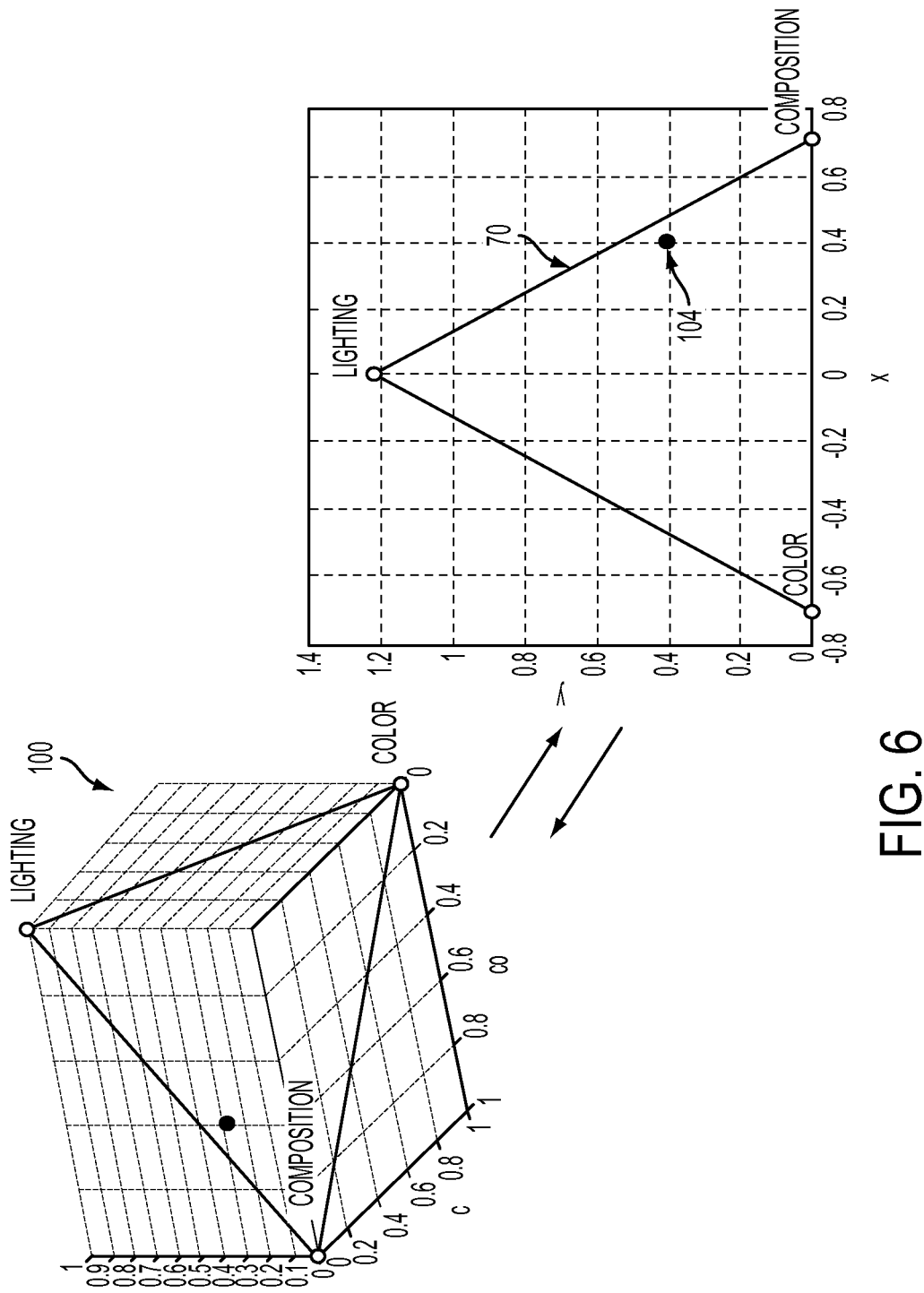
FIG. 6 illustrates projecting style characteristics onto a 2-dimensional style map.

To generate the two-dimensional representation 70 of the query space, a three-dimensional query space 100 can be projected onto the (x,y) plane 70 having only two dimensions, as shown, for example in FIG. 6. In this process, the points are translated and scaled. The process is simplified by having all style category values normalized.

Figure 7:
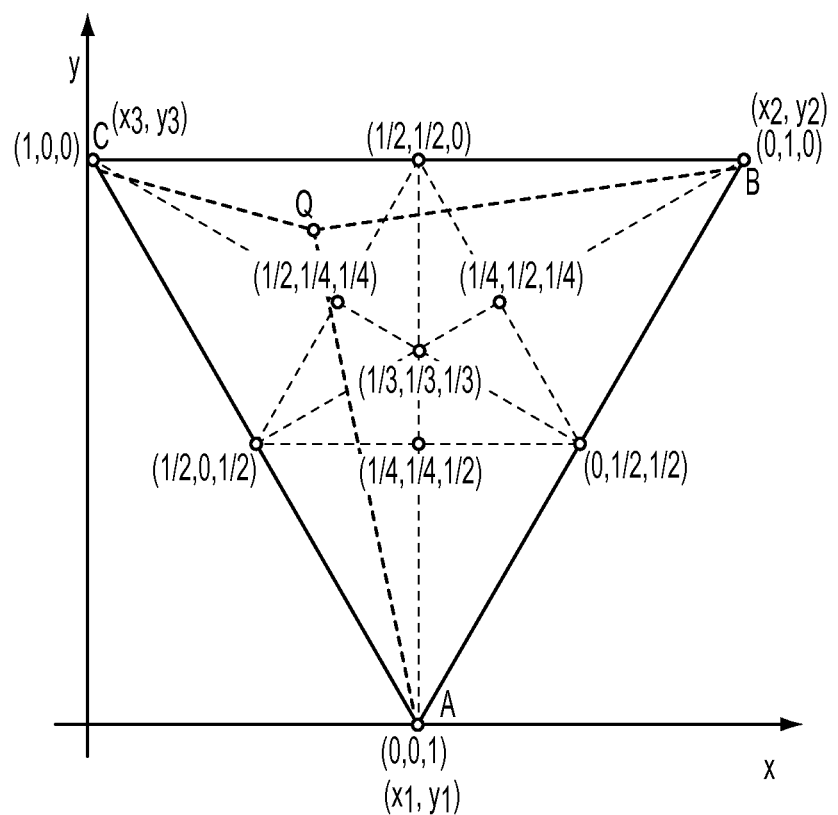
FIG. 7 illustrates using barycentric coordinates for computing style values of a user query.

In another embodiment, illustrated in FIG. 7, the query can be formulated using barycentric coordinates on a triangle 70, which again, is in only two dimensions. The user selects a 2-dimensional point, the corresponding barycentric coordinates are calculated, and the pertinent images are retrieved. FIG. 7, by way of example shows two-dimensional Cartesian coordinates $(x_i, y_i)$ and three-dimensional barycentric coordinates $(\lambda_1, \lambda_2, \lambda_3)$ on an equilateral triangle.

Thus, assume that a user has selected three target style categories denoted $c_1, c_2, c_3$, one style category for each of the three classes available (e.g., COLOR="duotones"=$c_1$, COMPOSITION="DOF"=$c_2$, LIGHTING="grainy"=$c_3$). The user then selects a single point Q=(x,y) in the Cartesian plane which lies within the 2-D triangle defined by the three Cartesian coordinates A=$(x_1,y_1)$, B=$(x, y_2)$, C=$(y_3)$.

The retrieval component 54 of the system converts the point (x,y) to barycentric coordinates $\lambda_1, \lambda_2, \lambda_3$. These may be calculated as follows:

$$\lambda_1 = \frac{(y_2 - y_3)(x - x_3) + (x_3 - x_2)(y - y_3)}{(y_2 - y_3)(x_1 - x_3) + (x_3 - x_2)(y_1 - y_3)} \tag{2}$$

$$\lambda_2 = \frac{(y_3 - y_1)(x - x_3) + (x_1 - x_3)(y - y_3)}{(y_2 - y_3)(x_1 - x_3) + (x_3 - x_2)(y_1 - y_3)} \tag{3}$$

$$\lambda_3 = 1 - \lambda_2 - \lambda_1 \tag{4}$$

$\lambda_1, \lambda_2, \lambda_3 \in [0,1]$ and they are proportional to the assigned areas of the triangles QBC, QCA and QAB. They also satisfy the following constraint:

$$\lambda_1 + \lambda_2 + \lambda_3 = 1 \tag{5}$$

The query 52 is then formulated as q=$[\lambda_1, \lambda_2, \lambda_3]$, where q specifies the relation between the three style categories.

In another embodiment, selected (x, y) style values within the triangle are converted to three dimensional values as follows: A constraint is imposed that the sum of the scores associated to these style categories is equal to 1:

$$\sum_{c \in \{c_1, c_2, c_3\}} i_t = 1. \tag{6}$$

Therefore the query space is the set of all convex combinations (the convex hull) of the set of points (1,0,0), (0,1,0) and (0,0,1). All possible search queries lie on the plane $i_{c_1} + i_{c_2} + i_{c_3} = 1$. A projection of this plane onto the (x,y) cardinal plane involves two rotations which are combined to form a projection matrix P:

$$P = \begin{bmatrix} 1 & 0 & 0 \\ 0 & \cos(\theta_2) & -\sin(\theta_2) \\ 0 & \sin(\theta_2) & \cos(\theta_2) \end{bmatrix} \begin{bmatrix} \cos(\theta_1) & -\sin(\theta_1) & 0 \\ \sin(\theta_1) & \cos(\theta_1) & 0 \\ 0 & 0 & 1 \end{bmatrix} \tag{7}$$

where $\theta_1$=45 and $\theta_2$=54.74. The forward transform is therefore:

$$\begin{bmatrix} x \\ y \end{bmatrix} = P \begin{bmatrix} c_1 \\ c_2 \\ c_3 \end{bmatrix} \quad (8)$$

while the reverse transform is:

$$\begin{bmatrix} c_1 \\ c_2 \\ c_3 \end{bmatrix} = P^{-1} \begin{bmatrix} x \\ y \end{bmatrix} \quad (9)$$

The user interface allows the user to select a point only within the convex hull 70 of the three projected points. The selected (x,y) point can be projected into the $(c_1, c_2, c_3)$ space using Equation (9), as shown in FIG. 6. For example, a user query corresponding to the (0.4,0.4) point marked on the two dimensional style map 70 of the query space is chosen in (x,y) space. This corresponds to $c_1$=0.62, $c_2$=0.62, $c_3$=0.33 in the three-dimensional query space.

The user may be able to specify other criteria for the query (other than the style category values). For example, as shown in FIG. 4 at 98, the user can select a keyword, e.g., from a set of keywords, for filtering or weighting the results of the search based on a user-selected one of a set of semantic (visual) categories. As noted above, the semantic categories may be assigned to images in a similar way to the style categories. In some embodiments, a mechanism is provided for enabling the user to select a value of the selected semantic category 98. For example, the semantic category may become one of the vertices 92 of the triangle. The selected position 96 within the triangle then selects a value for a combination of one or two style categories and one or two semantic categories. In another embodiment an additional dimension is provided for the semantic category, which may be orthogonal to the plane in which the triangle lies. For example, the system generates a three-dimensional visualization, such as a pyramid, for display on the screen. A user selects a position 96 within the pyramid. This is mapped by the system onto the triangle for obtaining the style values, with the distance from the plane of the triangle being used to compute the semantic value. Other mechanisms for selecting semantic values are also contemplated, such as the one-dimensional sliders in FIG. 5.

In other embodiments, the keyword(s) may be used as an initial query to retrieve database images which use the keyword itself (or a word(s) considered to be equivalent, based on a thesaurus or the like) in the image metadata (such as in a textual description supplied to the website by the photographer when submitting the photograph). The style-based query is then applied to the results of the keyword query.

The exemplary method integrates the results of the exemplary style-based classification into a graphical interface 34 through which the user can create style-based queries 52 in one click. Semantic aspects are also readily incorporated.

Retrieval (S114)

The query q can thus form the basis of a query of the database images 24, for example by computing a comparison (e.g., similarity or distance) measure between the query 52 and the style values, for the three user-selected categories, of each of the database images. This can be considered as a comparison of a three-dimensional vector for the query and a three dimensional vector for each of the database images. Each database image's values of the other style categories (i.e., other than the three selected by the user) can be ignored.

Any suitable comparison measure, such as the cosine similarity, Euclidian distance, the Manhattan distance, Earth Mover's distance or the like, can be used to identify the database images having the most similar set of three style values. Other comparison methods are also contemplated.

For example, given three categories $c_1$, $C_2$, $c_3$ selected by the user at step S112, an image i in database 26 is described with the following quantity:

$$p_i = [s_i^n(c_1), s_i^n(c_2), s_i^n(c_3)] \quad (10)$$

Given the query q corresponding to $\lambda_1, \lambda_2, \lambda_3$ and a set of database vectors $p_i$, the top K images are retrieved by using the following distance measure:

$$d(q, p_i) = \frac{\left\| q - \frac{p_i}{|p_i|} \right\|}{1 + |p_i|} \quad (11)$$

where $|p_i|$ is the length of $p_i$, which is 3 in the example embodiment of three style categories; and $$\left\| q - \frac{p_i}{|p_i|} \right\|$$

represents the Norm 2 (Euclidian distance) between the two vectors.

Other constraints could be put on the retrieval of database images.

Without intending to limit the scope of the exemplary embodiments, the following example describes application of the system and method.

Example

A database of approximately 15,000 images was generated by crawling a website (www.dpchallenge.com), operated for a social network of photo enthusiasts and organized around photographic challenges. Photographers submit images in response to time-bounded challenges which are periodically posted on the website. Each challenge is defined by a title and a short description such as:

Title: Shutter Speed

Description: Create an image where your choice of shutter speed leads to the main impact. Choose fast shutter speeds to freeze motion or slow ones to capture motion blur.

A time period for submitting photographs is also set. After the submission, the images are viewed by members of the community and scored with numeric votes between 1 and 10. In general, the images submitted comply to some degree with the challenge theme. If not, images are typically discarded by the moderator. Otherwise, they receive very low scores.

While some of the challenges relate to specific subjects, such as "wildlife," others are more related to photographic techniques (e.g. "duo-tones", "long exposure") or visual concepts ("circles", "burst of colors", "leading lines"). Among the challenges whose photographs are available on the website, 43 challenges related to photographic styles were identified. Since some challenges were related to each other (e.g. "long exposure," "double exposure") they were merged into a single style category. The number of style categories was reduced to 14.

The quality of the annotations that were inferred using the challenge's membership information was found to be very high. Typically, if an image received a high score for a specific category, it represents the theme of that category/challenge very well. However, it was observed that the pertinence of an image to the challenge category was not of particular relevance with respect to all the remaining categories (e.g., an image submitted to "black and white" could score high in a challenge related to composition such as "rule of thirds"). This leads to potential false negative annotations. To obtain a reliable ground truth for assessing the method, a random sample of 20% of the images from each challenge was generated, with a total of 2,809 annotations. These images were manually labeled with respect to the remaining 13 categories. The result was a multi-label dataset that was used as test set during the evaluation. A summary of the database information can be found in Table 1. Table 2 summarizes the assumptions which were made in annotating the test set.

TABLE 1

Breakdown of the number of training and test images for each style category

| Style category | No. of Training Examples | No. of Testing Examples | Total |
|---|---|---|---|
| Complementary Colors | 760 | 237 | 997 |
| Duo-tones | 1,041 | 589 | 1,630 |
| HDR | 317 | 83 | 400 |
| Image Grain | 672 | 183 | 855 |
| Light On White | 960 | 158 | 1,118 |
| Long Exposure | 676 | 208 | 884 |
| Macro | 1,359 | 459 | 1,818 |
| Motion Blur | 488 | 149 | 637 |
| Negative Image | 768 | 193 | 961 |
| Rule of Thirds | 1,112 | 398 | 1,510 |
| Shallow DOF | 1,184 | 677 | 1,861 |
| Silhouettes | 825 | 227 | 1,052 |
| Soft Focus | 568 | 169 | 737 |
| Vanishing Point | 540 | 102 | 642 |
| None | — | 238 | 238 |
| Total | 11,270 | 3,832 | 15,340 |

TABLE 2

Assumptions which were made for each category in order to perform the labeling

| Category | No. of Annotated Images | Comments |
|---|---|---|
| Complementary Colors | 189 | Red/green, blur/orange, or yellow/purple must be an integral part of the image. Involves some subjectivity, for example, if a color is orange enough or too close to red to be complementary with blue. |
| Duo-tones | 260 | Image is monochrome (black and white, sepia, etc.). |
| HDR | 79 | High dynamic range of luminance between lightest and darkest areas of an image (deep shadows and bright highlights should be visible). |
| Image Grain | 168 | Image contains grain or noise. In some images image grain is much more visible than in others. Involves subjectivity about whether there is enough noise. Very often found in duo tones. |
| Light On White | 239 | Background is white, foreground is a light color. Involves some subjectivity as to whether very lightly colored backgrounds are considered white. |
| Long Exposure | 169 | A few sub-types of such images can be identified, i) images with light-painting; ii) images with water smoothing; iii) images with ghosted subjects; iv) images at night with a lot of lighting. |
| Macro | 339 | A few sub-types of such images can be identified, i) extreme close-ups of subjects where the subject fills the image, ii) close-ups of subjects where the subject fills part of the image and there is a shallow depth of field, iii) close-ups of subjects where the subject fills part of the image and the entire image is in focus. |
| Motion Blur | 121 | A region of the image has undergone motion-blur. This may be due to a moving object, a moving camera, or by zooming the lens. At times the region of motion blur is small compared to the size of the image. |
| Negative Image | 191 | The image must be a negative of the original. Black and white negatives may be confused with duo-tones. |
| Rule of Thirds | 277 | Points of interest are placed on intersections of lines which divide image into 9 parts. A liberal interpretation of this rule may be employed. |
| Shallow DOF | 295 | An object of interest is isolated from its surround by being in sharp focus. In some images, most of the image is in sharp focus. |
| Silhouettes | 206 | Image contains a prominent silhouette. Often taken at sunset, where the sky has complementary blue and orange colors. |
| Soft Focus | 142 | Image is in soft focus. In some images, soft focus is much stronger than in others. Involves some subjectivity as to whether soft focus is too weak (sharp image) or too strong (very blurred). |
| Vanishing Point | 124 | Not all images in this category have a vanishing point, but all have lines that are converging towards one. |
| Total | 2,809 | |

Each image may have one or more of 66 tags specified by www.dpchallenge.com. Of note, are the macro and black and white tags, which indeed have a larger-than-average representation in the example dataset.

An application for retrieving images using the photographic style annotations calculated automatically by the classifier 20 was provided, as described above. Advantageous features of such an application are the simplicity and intuitiveness of use. The prototype system takes into account the taxonomy of styles presented in FIG. 1. In particular, it is assumed that queries can be formulated by specifying a combination of style categories belonging to the three classes: Composition, Color, and Lighting. The user is presented with a graphic interface as shown in FIG. 4, in the form of a triangle 70 which defines the space of possible queries which are represented by all points within the triangle. Each vertex of the triangle is associated with one of the three categories. The user can specify the desired combination of styles belonging to Composition, Color and Lighting.

The query space was generated by projecting the three-dimensional convex hull 100 onto the two dimensional query space 70, as illustrated in FIG. 6. As a result, points were translated and scaled.

Queries were executed using the framework described above and retrieved images (using the Euclidian distance as the comparison measure) were reviewed.

Classification performances for each category were measured using mean Average Precision: mAP. For the various features/training methods, mAP=50.54 (color), 49.28 (SIFT), 45.70 (LBP), 58.91 (color, SIFT and LBP combined, by late fusion).

The classification performances were evaluated using the 20% of images which had been manually annotated as a test fold and the rest were used for training.

For all 4 feature types, the best results were achieved for a classifier learned by stochastic gradient descent with a regularization parameter (for optimizing the multivariate loss function) of $10^{-3}$. For color and SIFT features, best results were achieved using a 3×3 spatial pyramid and the entire image. For the LBP feature, best results were achieved by employing a signature formed by concatenating sub-image feature vectors: using 1×3, 3×1, and 1×1 pyramids. All other parameters of the classifier 20 were set to default values for the comparison (these would normally be tailored to identify the best parameters).

Figure 8:
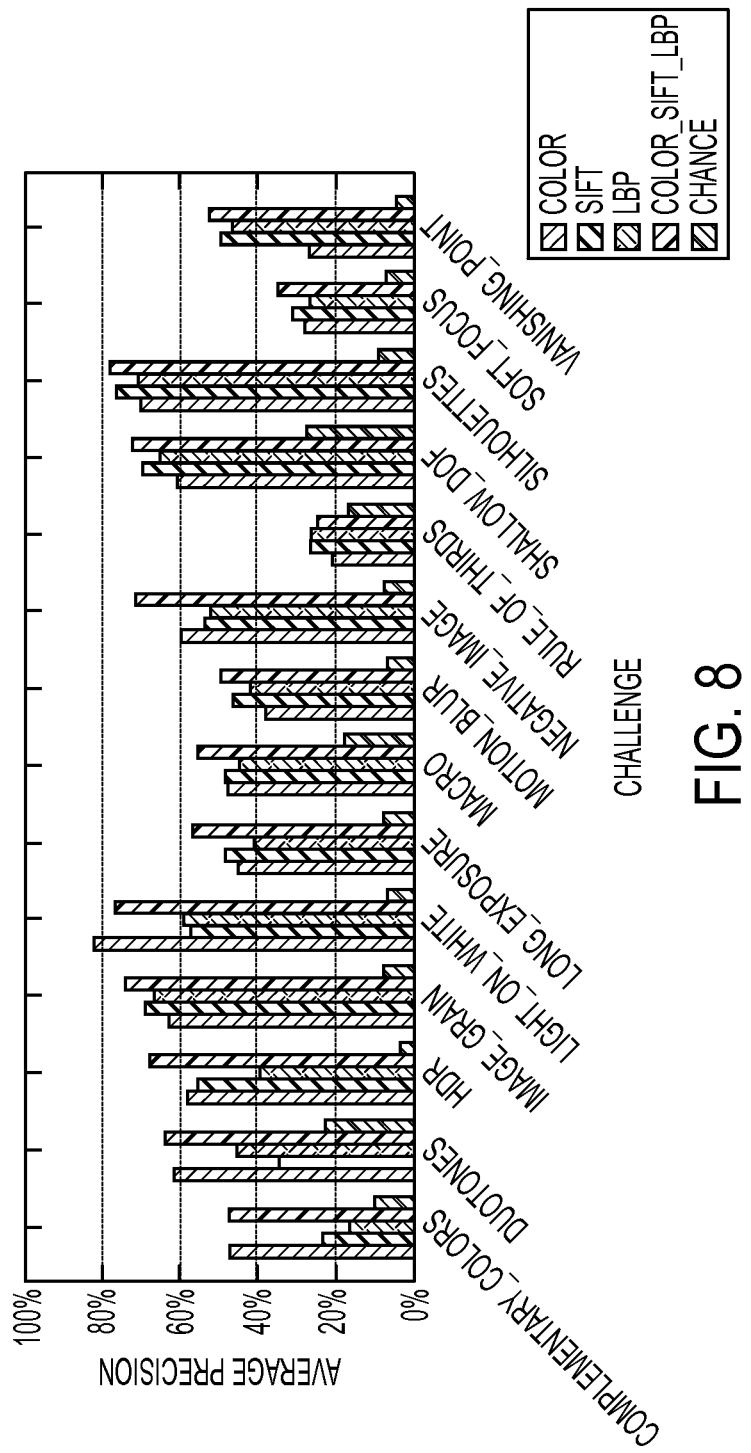
FIG. 8 illustrates the results of using various features for training a style-based classifier.

The color feature was found to perform much better for the "duo-tones," "complementary colors," "light on white," and "negative image" challenges. SIFT and LBP perform better for the "shallow depth of field" and "vanishing point" challenges. Results collected for EXIF features were relatively poor, with exception of "vanishing point" and "long exposure". Results were also obtained when late fusion was performed by averaging the classification scores of the three best-performing features (EXIF did not substantially improve the performance and was therefore dropped from consideration). The late fusion significantly increases the mean average precision (mAP) of the classification model. Results are summarized in FIG. 8.

In practice, a combination of the three best features, color, SIFT, and LBP provided a good performance over all 14 style categories, so it was not considered necessary to tailor the features used to the particular style category, although this is also contemplated. For example, weights for the features could be learned using a multiple kernel learning approach.

Results for four queries with varying weight given to three photographic styles: duo-tones, shallow depth of field (Shallow DOF), and image grain were obtained. The top nine images retrieved for each query were displayed, arranged in decreasing order of relevance. There was almost no overlap between the images in the four queries. The results showed a good correlation with what a photographer may be expecting from such a query, while providing a variety of different visual content. Accordingly, it can be inferred that the method would allow a photographer to narrow his search of an image database effectively.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for aiding a user in selecting images based on photographic style, comprising:
   with a trained classifier of a computing device that has been trained on images annotated according to a set of photographic style categories, assigning a style value for each of the set of photographic style categories to each of a set of database images;
   receiving a user's selection of a subset of the photographic style categories, the subset including at least two photographic style categories;
   generating a user interface for the user to assign values from a range of values to each of the selected photographic style categories in the subset; and
   identify a subset of images in the database by computing a comparison between the user's assigned values for each of the selected photographic style categories and the style values for each of the selected photographic style categories of the database images.

2. The method of claim 1, wherein the photographic style categories include photographic style categories selected from the group consisting of: complementary colors; negative image; duotones; light on white; macro; rule of thirds; shallow depth of focus; vanishing point; high dynamic range; image grain; long exposure; motion blur; silhouettes; and combinations thereof.

3. The method of claim 1, wherein the photographic style categories are partitioned among a plurality of style classes, and wherein user's selection of a subset of the photographic style categories comprises no more than one photographic style category from each of the classes.

4. The method of claim 3, wherein each of a plurality of the style classes includes at least two photographic style categories.

5. The method of claim 3, wherein there are exactly three style classes.

6. The method of claim 3, wherein:
   a first of the style classes includes at least two photographic style categories of the group consisting of: complementary colors; negative image; duotones; and light on white;
   a second of the style classes includes at least two photographic style categories of the group consisting of: macro; rule of thirds; shallow depth of focus; and vanishing point; and
   a third of the style classes includes at least two photographic style categories of the group consisting of: high dynamic range; image grain; long exposure; motion blur; and silhouettes.

7. The method of claim 1, wherein there are at least six photographic style categories.

8. The method of claim 1, wherein the selected subset of the photographic style categories comprises three photographic style categories.

9. The method of claim 1, wherein the assigning a style value for each of a set of photographic style categories to each of a set of database images comprises normalizing style scores output by the classifier to a scale of 0-1 for each of the style categories.

10. The method of claim 1, further comprising training the classifier with training images, each of the training images being labeled with a respective photographic style category selected from the set of photographic style categories.

11. The method of claim 10, wherein training of the classifier comprises extracting features from patches of the image and generating an image representation based on the extracted features.

12. The method of claim 11, wherein the extracted features are selected from the group consisting of color statistics, gradient features, local binary patterns, and combinations thereof.

13. The method of claim 1, further comprising receiving a user's selection of one of a set of semantic categories and wherein the identifying a subset of images in the database is also based on the selected semantic category.

14. The method of claim 13, further comprising providing a mechanism for integrating the semantic category into the user interface whereby a user assigns a value to the semantic category and wherein the identifying of the subset of images in the database is based on the user's assigned value for the selected semantic category.

15. The method of claim 1, further comprising displaying at least a portion of the identified database images to the user.

16. A method for aiding a user in selecting images based on photographic style, comprising:
  with a trained classifier of a computing device that has been trained on images annotated according to a set of photographic style categories, assigning a style value for each of the set of photographic style categories to each of a set of database images;
  receiving a user's selection of a subset of the photographic style categories, the selected subset of the photographic style categories comprising three photographic style categories;
  providing a user interface for assigning values to each of the selected photographic style categories, comprising:
    displaying a two-dimensional representation of the three user-selected photographic style categories which defines a query space;
    providing for the user to select coordinates within the two-dimensional representation; and
    assigning a value to each of three selected photographic style categories based on the selected coordinates; and
  identifying a subset of images in the database based on the user's assigned values for each of the selected photographic style categories and the style values for each of the selected photographic style categories of the database images.

17. The method of claim 16, wherein the two-dimensional representation comprises a triangle and wherein each vertex corresponds to a maximum value of a respective one of the three photographic style categories.

18. A computer program product comprising a non-transitory recording medium storing instructions, which when executed on a computer causes the computer to perform the method of claim 1.

19. A system comprising memory which stores instructions for performing the method of claim 1 and a processor in communication with the memory for executing the instructions.

20. A system for selecting images based on photographic style, comprising:
  memory which stores a set of database images, each of the database images having a style value assigned to it for each of a set of photographic style categories based on style scores output by a trained classifier;
  a generator component which generates a graphical user interface for display to a user, the graphical user interface enabling the user to select a subset of the photographic style categories, the generator component generating a representation of the selected photographic style categories, whereby the user assigns values for the selected photographic style categories, the representation of the photographic style categories comprising a triangle, the retrieval component comprising instructions for converting coordinates of a user-selected point within the triangle into a style value for each of three user-selected photographic style categories;
  a retrieval component for retrieving a set of images from the database based on the assigned values for each of the selected photographic style categories and the style values for each of the selected photographic style categories of the database images; and
  a processor which implements the generator component and the retrieval component.

21. The system of claim 20, further comprising a classifier training component configured for training the classifier with an associated set of training images, which are each labeled with a respective one of the style categories, and features extracted from the training images.

22. A method for generating a system for selecting images based on photographic style, comprising:
  with a processor, training a classifier with image representations based on features extracted from a set of training images and corresponding image labels, each of the training images being labeled with a respective photographic style category selected from a set of photographic style categories, the photographic style categories including at least six photographic style categories selected from the group consisting of: complementary colors; negative image; duotones; light on white; macro; rule of thirds; shallow depth of focus; vanishing point; high dynamic range; image grain; long exposure; motion blur; silhouettes; and combinations thereof, the photographic style categories being partitioned into three style classes, each comprising at least two of the style categories;
  with the trained classifier, assigning a style value from a normalized range of style values for each of the set of photographic style categories to each of a set of database images;
  storing the assigned style category values; and
  providing a user interface, whereby a subset of the set of database images is selectable by computing a comparison between a user-selected style value selected from the range of style values for a respective style category selected from each of the three style classes with the corresponding assigned style category values of the database images.

23. A computer program product comprising a non-transitory recording medium storing instructions, which when executed on a computer causes the computer to perform the method of claim 22.

24. A system comprising memory which stores instructions for performing the method of claim 22 and a processor in communication with the memory for executing the instructions.

\* \* \* \* \*